(12) United States Patent
Frenkel et al.

(10) Patent No.: US 7,023,939 B2
(45) Date of Patent: Apr. 4, 2006

(54) MULTI-CHANNEL DIGITAL MODEM

(75) Inventors: Liron Frenkel, Netania (IL); Roy Oren, Magshimim (IL)

(73) Assignee: Tioga Technologies Inc., San Jose, CA (US)

( * ) Notice: Subject to any disclaimer, the term of this patent is extended or adjusted under 35 U.S.C. 154(b) by 878 days.

(21) Appl. No.: 09/801,310

(22) Filed: Mar. 7, 2001

(65) Prior Publication Data

US 2002/0150153 A1 Oct. 17, 2002

(51) Int. Cl.
*H04B 1/10* (2006.01)
(52) U.S. Cl. ............... 375/350; 375/349; 375/285; 375/260; 370/543; 708/313
(58) Field of Classification Search ........ 375/260, 375/285, 229, 296, 346, 349, 350, 219, 222, 375/220, 256–257; 708/300, 313; 370/543–545
See application file for complete search history.

(56) References Cited

U.S. PATENT DOCUMENTS

| | | | | |
|---|---|---|---|---|
| 4,727,536 A | * | 2/1988 | Reeves et al. | 370/468 |
| 4,860,283 A | * | 8/1989 | Takano et al. | 370/470 |
| 5,212,659 A | * | 5/1993 | Scott et al. | 708/313 |
| 5,212,687 A | * | 5/1993 | De La Bourdonnaye | 370/538 |
| 5,420,888 A | * | 5/1995 | Davis et al. | 375/334 |
| 5,764,113 A | * | 6/1998 | Snell | 332/103 |
| 5,999,355 A | * | 12/1999 | Behrens et al. | 360/65 |
| 6,061,410 A | * | 5/2000 | Linz | 375/371 |
| 6,141,372 A | * | 10/2000 | Chalmers | 375/147 |
| 6,173,011 B1 | * | 1/2001 | Rey et al. | 375/233 |
| 6,223,298 B1 | * | 4/2001 | Tellier et al. | 713/501 |
| 6,240,132 B1 | * | 5/2001 | Yedid | 375/232 |
| 6,470,404 B1 | * | 10/2002 | Kim | 710/63 |
| 6,480,477 B1 | * | 11/2002 | Treadaway et al. | 370/314 |

(Continued)

OTHER PUBLICATIONS

Gardner, F., "Interpolation in Digital Modems—Part I: Fundamentals", *IEEE Transactions on Communications*, vol. 41, No. 3, Mar. 1993, pp. 501-507.
Erup, L., "Interpolation in Digital Modems—Part II: Implementation and Performance", *IEEE Transactions on Communications*, vol. 41, No. 6, Jun. 1993, pp. 998-1008.
Laakso, T. et al., "Splitting the Unit Delay", *IEEE Signal Processing Magazine*, Jan. 1996, pp. 30-60.

*Primary Examiner*—Jean B. Corrielus
(74) *Attorney, Agent, or Firm*—Darby & Darby

(57) ABSTRACT

An interpolation filter for processing a sequence of input samples provided at an input rate controlled by an input clock, so as to generate interpolants at an output rate controlled by an output clock, which is substantially independent of the input clock. The filter includes a plurality of stages arranged in a succession in which each of the stages, except for a first stage in the succession, is coupled respectively to a preceding one of the stages. Each of the stages includes a multiplier, coupled to receive the input samples and to multiply each of the samples by a respective coefficient determined responsive to a phase interval between the input clock and the output clock, so as to generate an interpolation product, and a multiplexer-accumulator, coupled to add the interpolation product, in synchronization with the input clock, to an interim value stored by the multiplexer-accumulator and, except for the first stage, further coupled to receive, in synchronization with the output clock, the interim value stored by the preceding stage, thereby generating the interpolants at an output of the multiplexer-accumulator of a last stage in the succession.

36 Claims, 5 Drawing Sheets

U.S. PATENT DOCUMENTS

| | | | |
|---|---|---|---|
| 6,496,540 B1* | 12/2002 | Widmer | 375/242 |
| 6,504,869 B1* | 1/2003 | Yedid | 375/232 |
| 6,640,239 B1* | 10/2003 | Gidwani | 709/203 |
| 6,704,324 B1* | 3/2004 | Holmquist | 370/465 |
| 2002/0031197 A1* | 3/2002 | Yedid | 375/355 |
| 2002/0110187 A1* | 8/2002 | May | 375/222 |
| 2002/0110210 A1* | 8/2002 | May et al. | 375/357 |
| 2002/0110213 A1* | 8/2002 | May et al. | 375/372 |

* cited by examiner

MULTI-CHANNEL DIGITAL MODEM

FIELD OF THE INVENTION

The present invention relates generally to digital communication devices, and specifically to digital modems.

BACKGROUND OF THE INVENTION

Timing in a data receiver, such as a receiver in a modem, must be synchronized with the symbols of the incoming data signal. Traditionally, this synchronization is accomplished by adjusting the phase of a sampling clock used to sample the incoming signal in order to synchronize it with the symbol clock. For this purpose, the symbol clock is recovered either from the analog input signal to the modem, prior to sampling, or from digital, post-sampling data. In either case, the object is to sample (or "strobe") the input signal a predetermined number of times per symbol interval. The sampling clock is adjusted for optimal detection of the symbols.

In some more recent digital modem designs, however, the sampling clock is not synchronized with symbol timing and instead remains independent of the symbol clock. To compensate for the asynchrony of the sample and symbol clocks, the modem performs digital interpolation among the non-synchronized samples of the input signal in order to reconstruct the symbols. The sample rate and symbol rates are thus "incommensurate," in the sense that the sample rate cannot be expressed as a rational multiple of the symbol rate (also referred to as the baud rate), and the sample time may never coincide exactly with desired strobe times. For optimal recovery of the symbols from the non-synchronously sampled signal, the interpolation must correct adaptively for the variable phase shift between the sampling clock and the symbol clock.

Various methods are known in the art for this sort of interpolation, which is also known as digital phase shifting. A survey of these methods is provided by Gardner in an article entitled "Interpolation in Digital Modems—Part I: Fundamentals," in *IEEE Transactions on Communications* 41(3), pages 501–507 (March 1993), which is incorporated herein by reference. Gardner describes a convenient mathematical model for calculating the values of interpolants— the digital signal values that are generated in the digital modem in synchronization with the symbol rate—as a function of the non-synchronized input samples from which the interpolants are derived. The synchronous interpolants are processed to recover the symbols.

FIG. 1 is a schematic timing diagram useful in understanding the determination of these interpolants, as described by Gardner. The modem sampling clock, with period $T_s$, is shown in the figure by ticks 10. The interpolants are generated so as to represent the signal value at interpolation intervals $T_i$, shown by ticks 12. Typically, $T_i=T/K$, wherein T is the symbol period and K is a small integer. Given a stream of input samples $x(mT_s)$, the interpolants $y(kT_i)$ can be expressed by the following formula:

$$y(kT_i) = \sum_{i=I_1}^{I_2} x[(m_k - i)T_s] \cdot h_I[(i + \mu_k)T_s] \quad (1)$$

Here $m_k$ is a "basepoint index," given by $m_k=\text{int}[kT_i/T_s]$, and $\mu_k$ is a fractional interval that reflects the current relative phase difference between the sampling clock and the symbol clock, given by $\mu_k=kT_i/T_s-m_k$. An offset 14 between a given sampling clock tick 10 and the next symbol interpolation tick 12 is thus equal to $\mu_k \cdot T_s$, as shown in the figure. $h_I(t)$ is the analog impulse response of an interpolating filter used for computing the interpolants, and $I_1$ and $I_2$ are fixed finite numbers that determine the range of samples over which the filter is applied. In effect, the filter described by equation (1) is implemented as a digital finite impulse response (FIR) filter with I taps, $I=I_2-I_1+1$.

A variety of implementation schemes have been suggested for digital modems with incommensurate, non-synchronized sampling. These schemes are typically based either on precomputing and storing appropriate coefficients of the interpolation filter $h_I$ for a given, known sample rate and symbol rate, or on computing the coefficients on-line, generally using polynomial-based filters. In the above-mentioned article, Gardner notes that $T_s$ should be adjusted so as to be nearly equal to $T_i$, so that $\mu_k$ will change only slowly, thus alleviating the need to compute a new value of $\mu_k$ for each sample. Exemplary implementation schemes for digital modems with interpolation filters are described by Erup et al., in "Interpolation in Digital Modems—Part II: Implementation and Performance," in *IEEE Transactions on Communications* 41(6), pages 998–1008 (June, 1993), and by Laakso et al., in "Splitting the Unit Delay," in *IEEE Signal Processing Magazine* (January, 1996), pages 30–60. Both of these articles are incorporated herein by reference.

SUMMARY OF THE INVENTION

It is an object of some aspects of the present invention to provide improved methods and devices for symbol recovery by interpolation, particularly for recovering symbols from an input signal that is sampled at a sampling rate that is not synchronized to the symbol rate.

It is a further object of some aspects of the present invention to provide a digital modem capable of transmitting and receiving signals over a number of communication channels simultaneously at different baud rates.

In preferred embodiments of the present invention, a multi-channel digital modem comprises multiple digital processing channels, which are configured to communicate over different, respective communication channels. Each of the channels is capable of operating, simultaneously with the other channels, at different transmit and receive baud rates. The multiple digital channels preferably share a common analog front end and a single system clock, which is typically unsynchronized with the symbol clocks of the channels. In other words, the signals received by the modem are all sampled at the same sampling rate, determined by the system clock, regardless of the different baud rates of the channels. Output signals transmitted by the modem are likewise generated at the same system clock rate. The modem is thus substantially simpler and less costly to implement than are multi-channel digital modems known in the art, in which each channel must have its own analog front end and independent sampling clock.

In some preferred embodiments of the present invention, this multi-channel operation using a single system clock is facilitated by a novel design of the digital interpolation filters used in the processing channels. The filter comprises a FIR filter whose taps are multiplexed so as to receive, at each clock tick, either the most recent input sample, multiplied by an appropriate interpolation coefficient, or the output of the preceding tap of the FIR. The multiplexing is controlled responsive to both the system clock (i.e., the sampling clock) and an interpolation clock, which is synchronized with the channel baud rate. The interpolation coefficients are prestored in a memory and are recalled depending on the phase shift that is calculated in each channel between the system clock and the interpolation clock. Multiplexing of the FIR taps allows the filter to accommodate a wide range of different baud rates, without having to adjust either the sampling clock or the prestored coefficients, which thus remain the same for all baud rates.

Although this innovative FIR design is particularly useful in the context of multi-channel digital modems, it can also be applied in single-channel modems and in other digital devices that perform variable-rate interpolation.

There is therefore provided, in accordance with a preferred embodiment of the present invention, an interpolation filter for processing a sequence of input samples provided at an input rate controlled by an input clock, so as to generate interpolants at an output rate controlled by an output clock, which is substantially independent of the input clock, the filter including a plurality of stages arranged in a succession in which each of the stages, except for a first stage in the succession, is coupled respectively to a preceding one of the stages, each of the stages including:

a multiplier, coupled to receive the input samples and to multiply each of the samples by a respective coefficient determined responsive to a phase interval between the input clock and the output clock, so as to generate an interpolation product; and a multiplexer-accumulator, coupled to add the interpolation product, in synchronization with the input clock, to an interim value stored by the multiplexer-accumulator and, except for the first stage, further coupled to receive, in synchronization with the output clock, the interim value stored by the preceding stage, thereby generating the interpolants at an output of the multiplexer-accumulator of a last stage in the succession.

Preferably, the stages are arranged so as to constitute a finite impulse response (FIR) filter, and the coefficient is determined based on a predetermined response of the filter. Further preferably, the filter includes a memory, adapted to store values of the coefficient at addresses in the memory corresponding to respective values of the phase interval, and coupled to output the values to the multiplier responsive to the address. In a preferred embodiment, the filter includes a coefficient interpolator, coupled to receive at least two of the values from the memory corresponding to approximate values of the phase interval and to calculate an exact value of the coefficient by interpolation between the approximate values.

Preferably, for any given value of the phase interval, the coefficient is substantially invariant with respect to the input rate and with respect to the output rate.

Preferably, the multiplexer-accumulator includes:

a register, adapted to store the interim value;

an adder, coupled to receive and sum the interpolation product and the interim value; and a multiplexer, having a first input coupled to the adder and, except for the first stage, a second input coupled to the preceding stage and an output coupled to the register, wherein the multiplexer is operative to select the first input responsive to the input clock and the second input responsive to the output clock.

Most preferably, the second input of the first stage is coupled so as to zero the interim value stored in the register of the first stage responsive to the output clock.

In a preferred embodiment, the input samples are generated by sampling, at the input rate, an input signal of a receiver, the input signal carrying a stream of symbols generated by a transmitter at a symbol rate, wherein the output rate is synchronized with the symbol rate. Preferably, the output rate is synchronized with the symbol rate irrespective of the input rate.

There is also provided, in accordance with a preferred embodiment of the present invention, a multichannel communication device, including:

an input unit, coupled to a plurality of communication lines for carrying signals at respective baud rates, and operative to transfer the signals received on the lines at an input rate determined by a common system clock, substantially unsynchronized with the baud rates of at least some of the lines; and a plurality of digital processing channels, each coupled to the input unit so as receive the signals at the input rate from a respective one of the lines and to process the signals so as to output symbols at one of the baud rates that is applicable to the signals carried on the respective one of the lines.

Preferably, the input unit includes an analog front end, which is operative to sample the signals at the input rate and to convey the sampled signals to the digital processing channels. In a preferred embodiment, the device includes a modem, and the signals include input signals, which are received from the communication lines, and output signals, which are transmitted over the communication lines by the digital processing channels via the analog front end.

Preferably, the plurality of digital processing channels includes at least first and second channels, which are adapted to process the signals so as to output symbols at different, respective first and second baud rates. Most preferably, the first and second channels are configured to output the symbols in synchrony with respective first and second symbol clocks, which are mutually substantially unsynchronized.

Further preferably, each of the digital processing channels includes a digital interpolation filter, which is coupled to process a sequence of input samples of the received signals provided at the input rate, and to generate interpolants at an output rate determined by an output clock in synchrony with the baud rate, for use in recovering the output symbols.

In a preferred embodiment, each of the digital processing channels includes:

a number-controlled oscillator (NCO), adapted to determine a fractional interval indicative of a phase offset between the system clock and the output clock, for use in driving the digital interpolation filter; and transmission circuitry, including a transmission interpolation filter, which is coupled to generate output samples for transmission over the communication lines, driven by the fractional interval determined by the NCO.

There is also provided, in accordance with a preferred embodiment of the present invention, a method for filtering a signal so as to generate interpolants at an output rate controlled by an output clock, the method including:

receiving a sequence of input samples at an input rate controlled by an input clock, substantially independent of the output clock;

processing the samples in a plurality of stages arranged in a succession, each of the stages, except for a last stage in the succession, being coupled respectively to a succeeding one of the stages, the processing including in each of the stages:

multiplying each of the samples by a respective coefficient determined responsive to a phase interval between the input clock and the output clock, so as to generate an interpolation product;

in synchronization with the input clock, adding the interpolation product to an interim value stored at the stage; and in synchronization with the output clock, transferring the interim value to the succeeding stage, thereby generating the interpolants at the last stage; and outputting the interpolants from the last stage in the succession.

In a preferred embodiment, receiving the sequence of input samples includes receiving a plurality of signals having respective symbol rates on a corresponding plurality of communication lines, and synchronizing the output rate includes synchronizing the output rates of the interpolants with the respective symbol rates of the corresponding communication lines. Preferably, processing the samples includes processing the samples of each of the signals in a respective one of a plurality of processing channels.

There is further provided, in accordance with a preferred embodiment of the present invention, a method for multi-channel communications, including:

receiving signals on a plurality of communication lines having respective baud rates;

transferring the signals received on the lines to a corresponding plurality of digital processing channels at an input rate determined by a common system clock, substantially unsynchronized with the baud rates of at least some of the lines; and processing the signals in each of the digital processing channels so as to generate output symbols at one of the baud rates that is applicable to the signals carried on the corresponding one of the lines.

Preferably, processing the signals includes interpolating among input samples of the signals responsive to a phase interval between the system clock and an output clock synchronized with one of the baud rates. Most preferably, the method further includes generating output samples for transmission over at least one of the communication lines by interpolating the samples responsive to the phase interval.

There is moreover provided, in accordance with a preferred embodiment of the present invention, an interpolation device for processing a sequence of input samples provided at a given input period, and having an output period that is substantially independent of the input period, the device including a finite impulse response (FIR) filter, adapted to process the input samples so as to generate a sequence of intermediate results in the filter at successive times corresponding to the output period, and to update the intermediate results for each of the input samples, and to output as an output sample, once in each output period, the intermediate result that was generated at an earliest one of the successive times among the intermediate results in the filter.

Preferably, the device includes a timing controller, which is coupled to determine a fractional interval indicative of a phase offset between the input period and the output period, wherein the filter generates and updates the intermediate results responsive to the fractional interval determined by the timing controller.

There is furthermore provided, in accordance with a preferred embodiment of the present invention, a method for filtering a sequence of input samples provided at a given input period, including:

processing the input samples in a finite impulse response (FIR) filter so as to generate a sequence of intermediate results in the filter at successive times corresponding to an output period of the filter, which is substantially independent of the input period;

updating the intermediate results for each of the input samples; and outputting as an output sample, once in each output period, the intermediate result that was generated at an earliest one of the successive times among the intermediate results in the filter.

The present invention will be more fully understood from the following detailed description of the preferred embodiments thereof, taken together with the drawings in which:

DETAILED DESCRIPTION OF PREFERRED EMBODIMENTS

Figure 1:
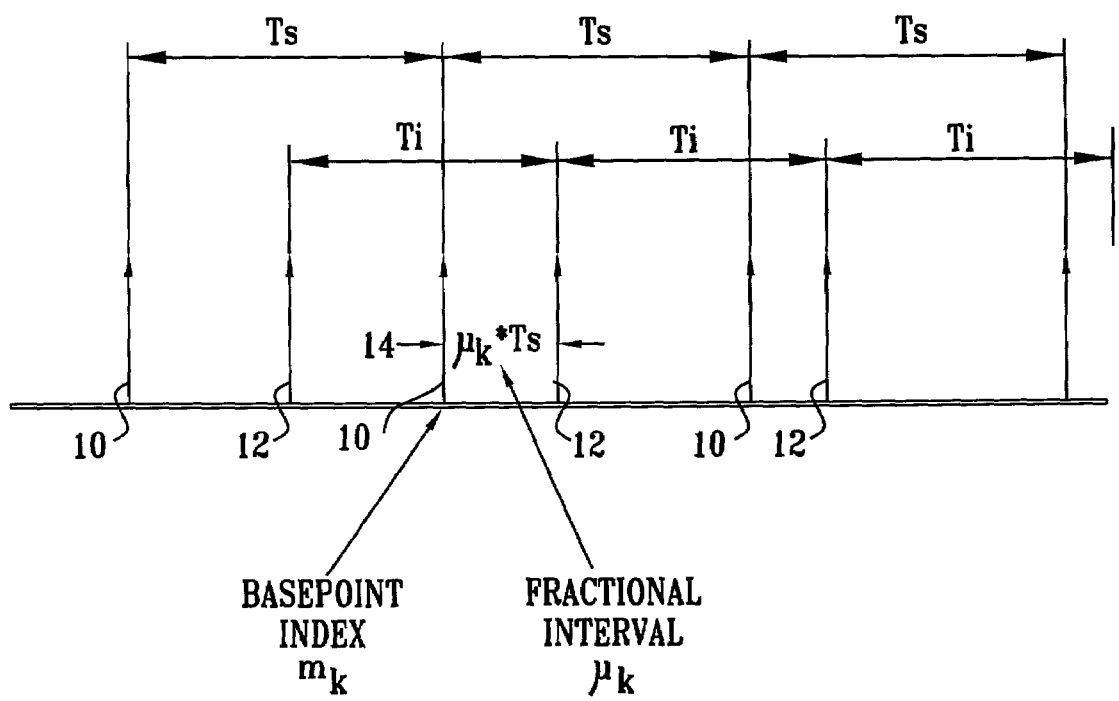
FIG. 1 is a schematic timing diagram useful in understanding methods of interpolation used in digital modems, as are known in the art.
Figure 2:
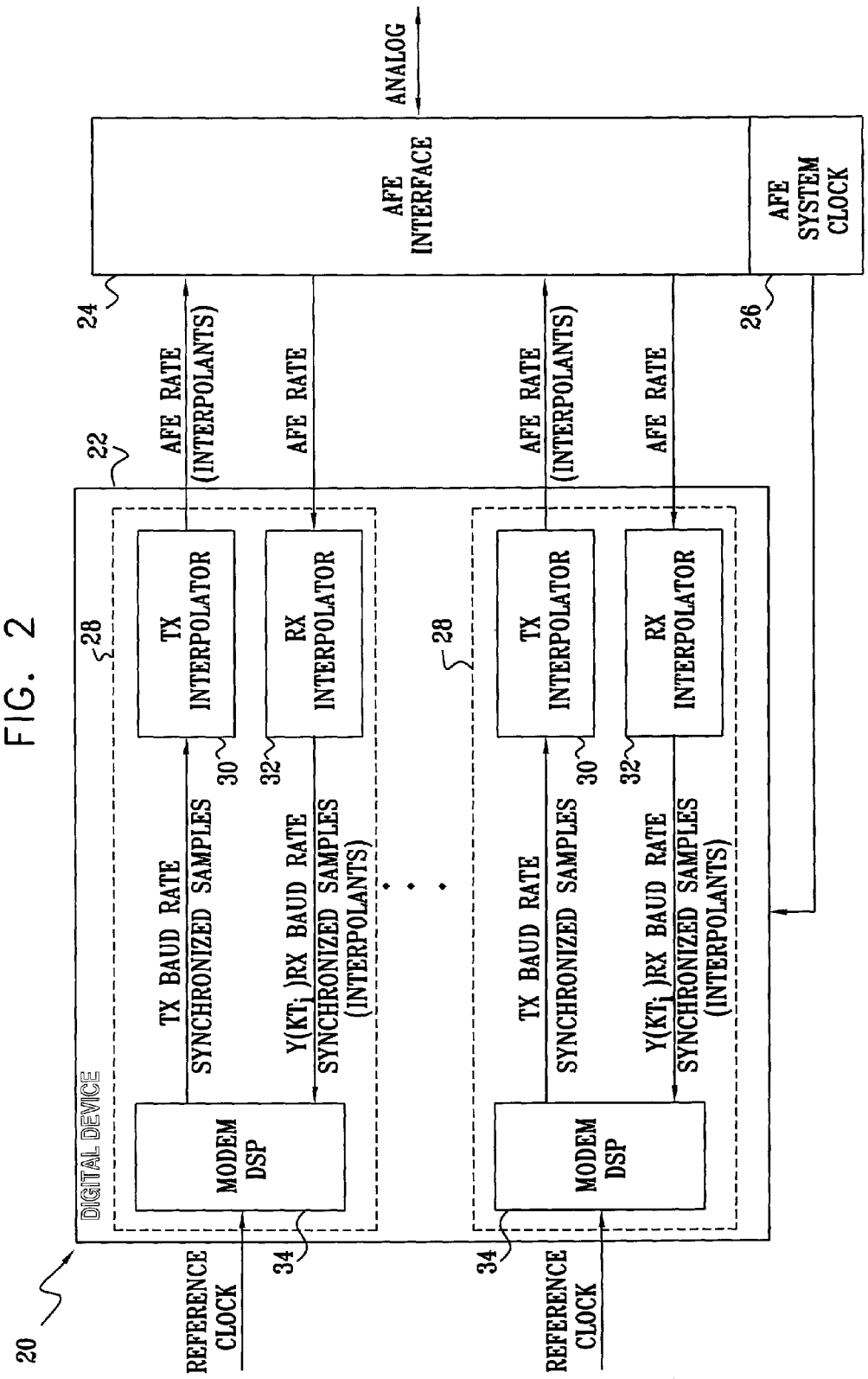
FIG. 2 is a block diagram that schematically illustrates a multi-channel digital modem, in accordance with a preferred embodiment of the present invention.

Reference is now made to FIG. 2, which is a block diagram that schematically illustrates a multi-channel modem 20, in accordance with a preferred embodiment of the present invention. Modem 20 comprises a digital processing section 22, including multiple processing channels 28, and an analog front end (AFE) interface section 24, which is shared among the multiple digital channels. AFE 24 links the modem to multiple analog communication channels, such as telephone lines to subscriber premises. A clock generator 26 provides a sampling clock to AFE 24, thus determining the sampling rate $T_s$ of the analog/digital and digital/analog converter circuits in the AFE (not shown in the figure). In order for digital section 22 to exchange digital signal samples with AFE 24 at this sampling rate, clock generator 26 also provides a system clock at the sampling rate to the digital section.

Each processing channel 28 comprises a transmission (Tx) interpolator 30 and a reception (Rx) interpolator 32, whose structure and operation are described in detail hereinbelow. A digital signal processor (DSP) 34 generates Tx baud-rate-synchronized samples at a rate corresponding to a predetermined transmission baud rate. Symbol transmission is optionally synchronized to a reference clock input, which is independent of the system clock provided by clock generator 26. Tx interpolator 30 processes the baud-rate-synchronized samples to generate a stream of output samples, or interpolants, for transmission by AFE 24. Each Rx interpolator 32 receives a stream of input samples, based on sampling of a respective input signal by the AFE at the sampling clock rate. Interpolator 32 interpolates the samples to generate input interpolants, which are synchronized to the appropriate reception baud rate (for example, four interpolants per symbol). DSP 34 processes the input interpolants to recover the information bits from the input signal. The transmission and reception baud rates may be the same or different, depending on system requirements.

Figure 3:
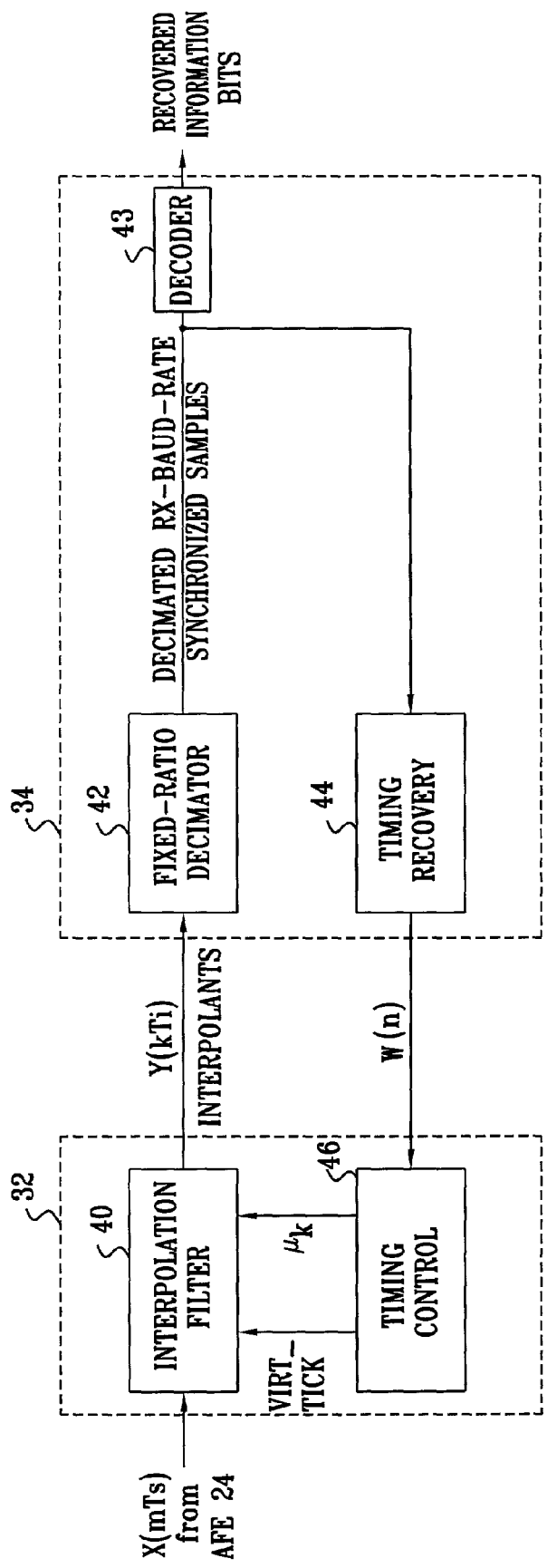
FIG. 3 is a block diagram that schematically illustrates a digital processing channel in a modem, in accordance with a preferred embodiment of the present invention.

FIG. 3 is a block diagram that schematically illustrates details of a portion of one of processing channels 28, used for processing input samples received from AFE 24, in accordance with a preferred embodiment of the present invention. As shown in this figure, Rx interpolator 32 comprises an interpolation filter 40, which receives the input samples, $x(mT_s)$, at the AFE clock sampling rate ($1/T_s$) and generates interpolants $y(kT_i)$ at the interpolation rate ($1/T_i$), which is synchronized with the reception baud rate. Filter 40 is capable of handling multiple different baud rates and interpolation rates without the need for reprogramming filter coefficients, as described below in detail with reference to FIG. 4. The coefficients are selected based on the fractional phase interval, $\mu_k$, which is determined and input to filter 40 by a timing controller 46, along with a baud-rate-synchronized clock signal, "virt_tick," at rate $1/T_i$.

The interpolants produced by filter 40 are optionally input to a fixed-ratio decimator 42, which processes the interpolants to generate samples at a reduced rate. The Rx baud-rate-synchronized samples from the decimator are input to a decoder 43, which recovers the information bits from the signal using processing methods known in the art, as in conventional modems. Decimator 42 is useful in order to decrease the complexity of interpolation filter 40 and may be used, for example, to reduce the sample rate input to the decoder from four times the baud rate to twice the baud rate. The decimator and decoder are preferably implemented as a part of DSP 34, along with a timing recovery block 44. This latter block generates a control word W(n), which is used by timing control block 46 in determining $\mu_k$ and virt_tick. The control word is a positive integer, which is indicative of a ratio of the sampling period $T_s$ to the interpolation clock period $T_i$ (as opposed to the fractional $W(n)=T_i/T_s$, used in conventional systems, such as those described in the above-mentioned article by Gardner). W(n) is determined by block 44 using methods of timing recovery known in the art, and is adjusted so that filter 40 strobes out the interpolants at near-optimal sampling times. When the feedback loop formed by blocks 44 and 46 is in equilibrium, W(n) is nearly constant.

Figure 4:
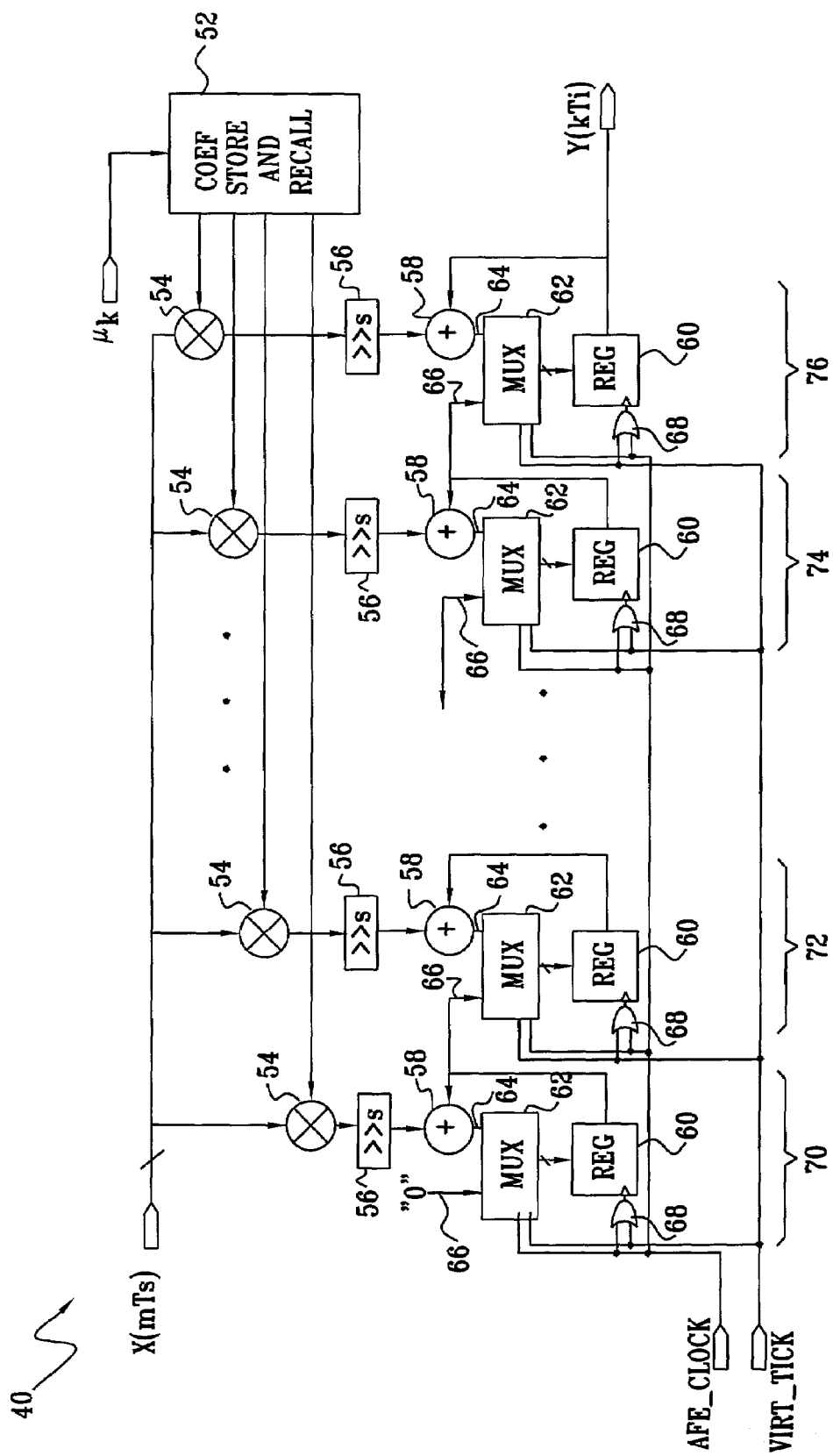
FIG. 4 is a block diagram that schematically illustrates a FIR filter used in digital interpolation of communication signals, in accordance with a preferred embodiment of the present invention.

FIG. 4 is a block diagram that schematically shows details of interpolation filter 40, in accordance with a preferred embodiment of the present invention. As described below, filter 40 is capable of operating at a range of different symbol (baud) rates, independent of the rate of the sampling clock (system clock) provided by AFE 24. For this purpose, the filter receives and synchronizes its operation both to the AFE clock and to a symbol clock. The virt_tick clock signal determines the rate at which the filter generates interpolants $y(kT_i)$.

Regardless of the clock rates, the interpolation coefficients applied by the filter are preferably provided by the same read-only memory (ROM) in a coefficient storage and recall block 52. In the most basic embodiment, block 52 simply comprises the ROM, along with appropriate addressing logic. The ROM is addressed according to the fractional phase interval, $\mu_k$, as generated by timing controller 46. A new set of coefficients is typically read out for each tick of the AFE clock. The phase resolution of the interpolator is determined by the size of the ROM. A more complex embodiment of block 52, with enhanced phase resolution, is shown below in FIG. 5.

Filter 40 has the general form of a multi-tap FIR filter, comprising a plurality of stages 70, 72, . . . , 74, 76. Each stage comprises a multiplier 54, which multiplies the current sample $x(mT_s)$ of the input signal by the respective coefficient at each tick of the AFE clock. The coefficients are determined so as to implement an appropriate interpolation function h(t), as described in the Background of the Invention. The choices of interpolation function and number of taps of the filter, as well as the phase resolution of the coefficients supplied by block 52, are determined based on the signal/noise ratio and other requirements of modem 20, as will be apparent to those skilled in the art. Each of the multiplication products is truncated by a shifter 56 and is summed by an adder 58 with the contents of a register 60, in which the sum of the addition is then stored.

Access to register 60 is controlled by a multiplexer 62 with inputs 64 and 66. Input 64, which connects adder 58 to the register, is selected on the rising edge of each AFE clock pulse. Each register thus accumulates the products of the successive samples $x(mT_s)$ and the respective filter coefficients that are generated in its own stage of the filter between one tick of the virt_tick symbol clock and the next. Input 66 of register 60 is selected on the rising edge of each virt_tick, causing the contents of each register 60 to be shifted over to the register in the next stage of the filter (except for first stage 70, which has its input 66 set to zero, and last stage 76, which outputs an interpolant $y(kT_i)$ at each virt_tick).

Each register 60 is coupled by an OR gate 68 to be triggered by either the AFE clock or the virt_tick symbol clock. Thus, adder 58, multiplexer 62 and register 60 and the accompanying logic circuits together function as a dual-input multiplexer-accumulator in each of the stages of filter 40.

To summarize, filter 40 accepts the input signal samples at the sample clock rate and outputs the interpolants in synchrony with the symbol clock rate, over a wide range of different clock rates and irrespective of the ratio between the rates. The length of the filter in the time domain is equal to the number of taps times $T_i$, i.e., it is determined by the symbol rate and is independent of the sampling rate. The gain of filter 40 is preferably adjusted to compensate for the different values of $T_i$, relative to $T_s$, by varying the shift applied by shifters 56 and, most preferably, by an additional gain circuit (not shown) at the output of the filter. It is the novel design of filter 40, with its accompanying timing blocks, that allows the multiple processing channels 28 is digital section 22 of modem 20 to operate at different, independent baud rates while sharing a common AFE 24 and system clock generator 26.

Figure 5:
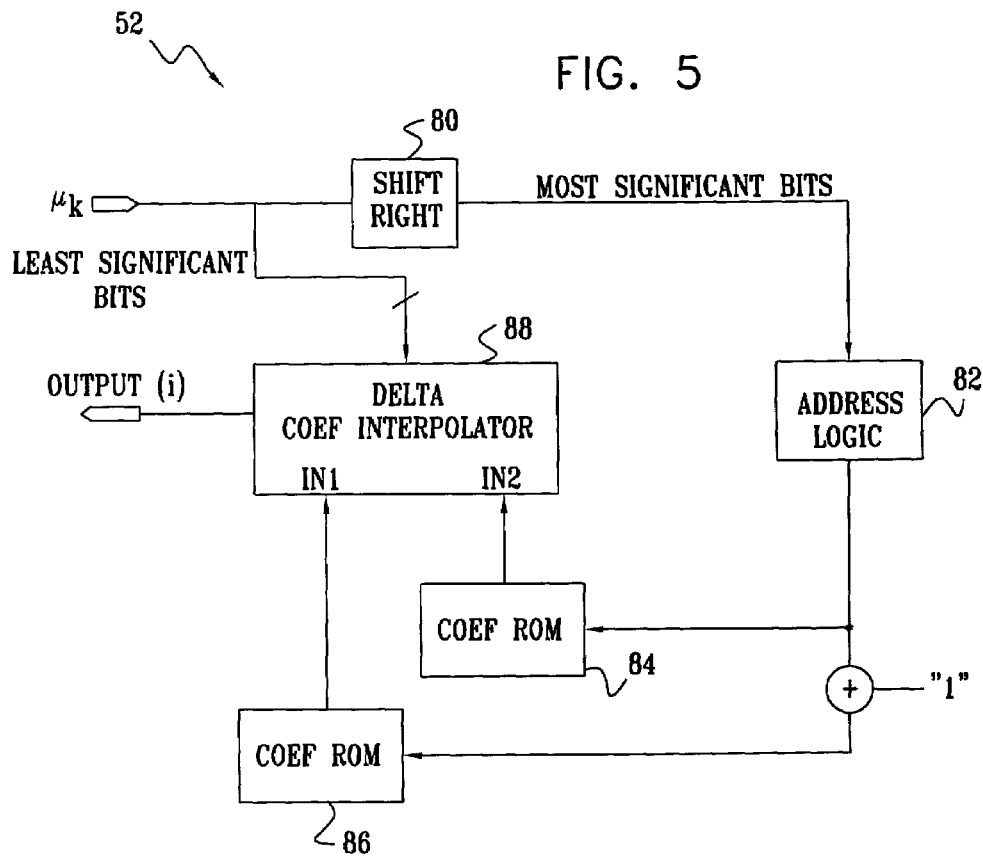
FIG. 5 is a block diagram that schematically illustrates an interpolation coefficient generator, in accordance with an alternative embodiment of the present invention.

FIG. 5 is a block diagram that schematically illustrates coefficient storage and recall block 52, in accordance with an alternative embodiment of the present invention. This embodiment allows very fine resolution in generating filter coefficients based on the fractional phase interval, $\mu_k$, received by block 52 from timing controller 46. The values of $\mu_k$ are shifted right by a shifter 80, leaving only the most significant bits of $\mu_k$, which are input to address logic 82. ROMs 84 and 86 preferably hold identical sets of filter coefficients. Logic 82 addresses adjacent entries in the two ROMs (at a relative address offset of one bit), thus providing two sets of input coefficients, corresponding to rounded values of $\mu_k$ above and below the current input value. The least significant bits of $\mu_k$, reflecting the position of $\mu_k$ at full precision (without right shifting), relative to the rounded values, are used to control a coefficient interpolator 88. The interpolator produces a suitably weighted sum of the input coefficients for output to multipliers 54.

Figure 6:
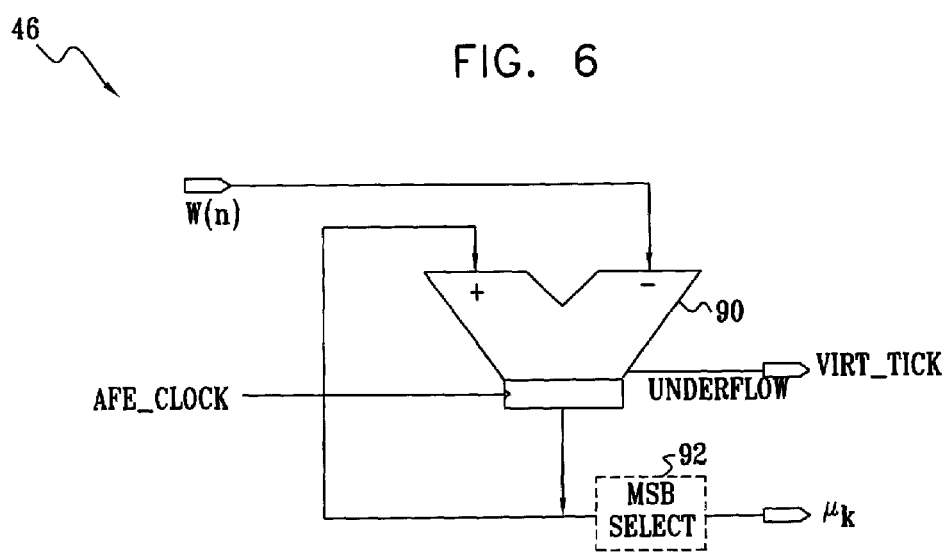
FIG. 6 is a block diagram that schematically illustrates a number-controlled oscillator (NCO) for use in controlling a digital interpolation filter, in accordance with a preferred embodiment of the present invention.

FIG. 6 is a block diagram showing a detail of timing controller 46, in accordance with a preferred embodiment of the present invention. Controller 46 comprises a number-controlled oscillator (NCO), implemented here as a modulo accumulator 90. The modulo itself is determined by the resolution of the coefficient values provided by coefficient store and recall block 52. In other words, the modulo is equal to the number of different possible values of the fractional phase interval, $\mu_k$. At each tick of the AFE clock, the control word W(n), calculated by timing recovery block 44, is subtracted from the accumulated value in accumulator 90. The remainder gives the appropriate value of $\mu_k$ for each new input sample, reflecting the phase offset of the sample from the currently interpolant. When not all of the bits of $\mu_k$ are required by block 52, an optional MSB selector 92 selects the most significant bits from the accumulator output. When the accumulated value passes through zero, the virt_tick signal is asserted, signaling to interpolation filter 40 that a new output sample must be produced.

In a preferred embodiment of the present invention, while Rx interpolator 32 uses the novel interpolation scheme shown in FIG. 4, Tx interpolator 30 uses a conventional interpolation scheme, as described by the references cited in the Background of the Invention. Consequently, the NCO of timing controller 46 can be used for both the Tx and Rx interpolators, generating appropriate values of $\mu_k$ and virt_tick for both of them.

Although filter 40 and its associated timing blocks particularly useful in the context of multi-channel digital modems, the principles of the present invention can also be applied in single-channel modems, as well as in other digital devices that perform variable-rate interpolation. For example, digital processing channels 28 may be coupled together to serve as a digital repeater, which operates without the need for synchronization of symbol and sample clocks.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An interpolation filter for processing a sequence of input samples provided at an input rate controlled by an input clock, so as to generate interpolants at an output rate controlled by an output clock, which is substantially independent of the input clock, the filter comprising a plurality of stages arranged in a succession in which each of the stages, except for a first stage in the succession, is coupled respectively to a preceding one of the stages, each of the stages comprising:
    a multiplier, coupled to receive the input samples and to multiply each of the samples by a respective coefficient determined responsive to a phase interval between the input clock and the output clock, so as to generate an interpolation product; and
    a multiplexer-accumulator, coupled to add the interpolation product, in synchronization with the input clock, to an interim value stored by the multiplexer-accumulator and, except for the first stage, further coupled to receive, in synchronization with the output clock, the interim value stored by the preceding stage, thereby generating the interpolants at an output of the multiplexer-accumulator of a last stage in the succession.

2. A filter according to claim 1, wherein the stages are arranged so as to constitute a finite impulse response (FIR) filter, and wherein the coefficient is determined based on a predetermined response of the filter.

3. A filter according to claim 1, further comprising a memory, adapted to store values of the coefficient at addresses in the memory corresponding to respective values of the phase interval, and coupled to output the values to the multiplier responsive to the addresses.

4. A filter according to claim 3, further comprising a coefficient interpolator, coupled to receive at least two of the values from the memory corresponding to approximate values of the phase interval and to calculate an exact value of the coefficient by interpolation between the approximate values.

5. A filter according to claim 1, wherein for any given value of the phase interval, the coefficient is substantially invariant with respect to the input rate.

6. A filter according to claim 1, wherein for any given value of the phase interval, the coefficient is substantially invariant with respect to the output rate.

7. A filter according to claim 1, wherein the multiplexer-accumulator comprises:
    a register, adapted to store the interim value;
    an adder, coupled to receive and sum the interpolation product and the interim value; and
    a multiplexer, having a first input coupled to the adder and, except for the first stage, a second input coupled to the preceding stage and an output coupled to the register, wherein the multiplexer is operative to select the first input responsive to the input clock and the second input responsive to the output clock.

8. A filter according to claim 7, wherein the second input of the first stage is coupled so as to zero the interim value stored in the register of the first stage responsive to the output clock.

9. A filter according to claim 1, wherein the input samples are generated by sampling, at the input rate, an input signal of a receiver, the input signal carrying a stream of symbols generated by a transmitter at a symbol rate, wherein the output rate is synchronized with the symbol rate.

10. A filter according to claim 9, wherein the output rate is synchronized with the symbol rate irrespective of the input rate.

11. A multichannel communication device, comprising:
    an input unit, coupled to a plurality of communication lines for carrying signals at respective baud rates, and operative to transfer the signals received on the lines at an input rate determined by a common system clock, substantially unsynchronized with the baud rates of at least some of the lines; and
    a plurality of digital processing channels, each coupled to the input unit so as to receive the signals at the input rate from a respective one of the lines and to process the signals so as to output symbols at one of the baud rates that is applicable to the signals carried on the respective one of the lines,
    wherein each of the digital processing channels comprises a digital interpolation filter, which is coupled to process a sequence of input samples of the received signals provided at the input rate, and to generate interpolants at an output rate determined by an output clock in synchrony with the baud rate, for use in recovering the output symbols.

12. A device according to claim 11, wherein the input unit comprises an analog front end, which is operative to sample the signals at the input rate and to convey the sampled signals to the digital processing channels.

13. A device according to claim 12, wherein the device comprises a modem, and wherein the signals comprise input signals, which are received from the communication lines, and output signals, which are transmitted over the communication lines by the digital processing channels via the analog front end.

14. A device according to claim 11, wherein the plurality of digital processing channels comprises at least first and second digital processing channels, which are adapted to process the signals so as to output symbols at different, respective first and second baud rates.

15. A device according to claim 11, wherein the filter comprises a plurality of stages arranged in a succession in which each of the stages, except for a first stage in the succession, is coupled respectively to a preceding one of the stages, each of the stages comprising:
   a multiplier, coupled to receive the input samples and to multiply each of the samples by a respective coefficient determined responsive to a phase interval between the system clock and the output clock, so as to generate an interpolation product; and
   a multiplexer-accumulator, coupled to add the interpolation product, in synchronization with the system clock, to an interim value stored by the multiplexer-accumulator and further coupled, except for the first stage, to receive, in synchronization with the output clock, the interim value stored by the preceding stage, thereby generating the interpolants at an output of the multiplexer-accumulator of a last stage in the succession.

16. A device according to claim 11, wherein each of the digital processing channels comprises:
   a number-controlled oscillator (NCO), adapted to determine a fractional interval indicative of a phase offset between the system clock and the output clock, for use in driving the digital interpolation filter; and
   transmission circuitry, comprising a transmission interpolation filter, which is coupled to generate output samples for transmission over the communication lines, driven by the fractional interval determined by the NCO.

17. A multichannel communication device comprising:
   an input unit, coupled to a plurality of communication lines for carrying signals at respective baud rates, and operative to transfer the signals received on the lines at an input rate determined by a common system clock, substantially unsynchronized with the baud rates of at least some of the lines; and
   a plurality of digital processing channels, each coupled to the input unit so as to receive the signals at the input rate from a respective one of the lines and to process the signals so as to output symbols at one of the baud rates that is applicable to the signals carried on the respective one of the lines,
   wherein the plurality of digital processing channels comprises at least first and second digital processing channels, which are adapted to process the signals so as to output symbols at different, respective first and second baud rates, and
   wherein the first and second channels are configured to output the symbols in synchrony with respective at least first and second digital processing symbol clocks, which are mutually substantially unsynchronized.

18. A method for filtering a signal so as to generate interpolants at an output rate controlled by an output clock, the method comprising:
   receiving a sequence of input samples at an input rate controlled by an input clock, substantially independent of the output clock;
   processing the samples in a plurality of stages arranged in a succession, each of the stages, except for a last stage in the succession, being coupled respectively to a succeeding one of the stages, the processing comprising in each of the stages:
      multiplying each of the samples by a respective coefficient determined responsive to a phase interval between the input clock and the output clock, so as to generate an interpolation product;
      in synchronization with the input clock, adding the interpolation product to an interim value stored at the stage; and
      in synchronization with the output clock, transferring the interim value to the succeeding stage, thereby generating the interpolants at the last stage; and
   outputting the interpolants from the last stage in the succession.

19. A method according to claim 18, wherein the stages are arranged so as to constitute a finite impulse response (FIR) filter, and wherein multiplying each of the samples comprises determining the coefficient based on a predetermined response of the filter.

20. A method according to claim 18, wherein determining the coefficient comprises storing values of the coefficient at addresses in a memory corresponding to respective values of the phase interval, and recalling the values for multiplication thereof responsive to the addresses.

21. A method according to claim 20, wherein recalling the values comprises recalling at least two of the values from the memory, corresponding to approximate values of the phase interval, and wherein determining the coefficient comprises computing an exact value of the coefficient by interpolation between the approximate values.

22. A method according to claim 18, wherein multiplying each of the samples comprises processing the interpolants so as to determine the phase interval for use in determining the respective coefficient.

23. A method according to claim 18, wherein for any given value of the phase interval, the coefficient is substantially invariant with respect to the input rate.

24. A method according to claim 18, wherein for any given value of the phase interval, the coefficient is substantially invariant with respect to the output rate.

25. A method according to claim 18, wherein receiving the sequence of input samples comprises sampling, at the input rate, an input signal of a receiver, the input signal carrying a stream of symbols generated by a transmitter at a symbol rate, and wherein generating the interpolants comprises synchronizing the output rate at which the interpolants are generated with the symbol rate.

26. A method according to claim 25, wherein synchronizing the output rate comprises synchronizing the output rate with the symbol rate irrespective of the input rate.

27. A method according to claim 25, wherein receiving the sequence of input samples comprises receiving a plurality of signals having respective symbol rates on a corresponding plurality of communication lines, and wherein synchronizing the output rate comprises synchronizing the output rates of the interpolants with the respective symbol rates of the corresponding communication lines.

28. A method according to claim 27, wherein processing the samples comprises processing the samples of each of the signals in a respective one of a plurality of processing channels.

29. A method for multichannel communications, comprising:
- receiving signals on a plurality of communication lines having respective baud rates;
- transferring the signals received on the lines to a corresponding plurality of digital processing channels at an input rate determined by a common system clock, substantially unsynchronized with the baud rates of at least some of the lines; and
- processing the signals in each of the digital processing channels so as to generate output symbols at one of the baud rates that is applicable to the signals carried on the corresponding one of the lines,
- wherein processing the signals comprises interpolating among input samples of the signals responsive to a phase interval between the system clock and an output clock synchronized with one of the baud rates.

30. A method according to claim 29, wherein receiving the signals comprises receiving analog signals and sampling the analog signals at the input rate, and wherein transferring the signals comprises conveying the sampled signals to the digital processing channels.

31. A method according to claim 29, wherein the received signals comprise incoming signals, and further comprising transmitting outgoing signals over the communication lines using the digital processing channels.

32. A method according to claim 29, wherein receiving the signals comprises receiving at least first and second signals at different, respective first and second baud rates, and wherein processing the signals comprises generating the symbols substantially simultaneously in different ones of the digital processing channels at the first and second baud rates.

33. A method according to claim 29, further comprising generating output samples for transmission over at least one of the communication lines by interpolating the samples responsive to the phase interval.

34. A method for multichannel communications, comprising:
- receiving signals on a plurality of communication lines having respective baud rates;
- transferring the signals received on the lines to a corresponding plurality of digital processing channels at an input rate determined by a common system clock, substantially unsynchronized with the baud rates of at least some of the lines; and
- processing the signals in each of the digital processing channels so as to generate output symbols at one of the baud rates that is applicable to the signals carried on the corresponding one of the lines,
- wherein receiving the signals comprises receiving at least first and second signals at different, respective first and second baud rates, and wherein processing the signals comprises generating the symbols substantially simultaneously in different ones of the digital processing channels at the first and second baud rates, and
- wherein generating the symbols at the first and second baud rates comprises generating the symbols in synchrony with respective first and second symbol clocks, which are mutually substantially unsynchronized.

35. An interpolation device for processing a sequence of input samples provided at a given input period, and having an output period that is substantially independent of the input period, the device comprising:
- a finite impulse response (FIR) filter, adapted to process the input samples so as to generate a sequence of intermediate results in the filter at successive times corresponding to the output period, and to update the intermediate results for each of the input samples, and to output as an output sample, once in each output period, the intermediate result that was generated at an earliest one of the successive times among the intermediate results in the filter;
- a timing controller, which is coupled to determine a fractional interval indicative of a phase offset between the input period and the output period, wherein the filter generates and updates the intermediate results responsive to the fractional interval determined by the timing controller.

36. A method for filtering a sequence of input samples provided at a given input period, comprising:
- processing the input samples in a finite impulse response (FIR) filter so as to generate a sequence of intermediate results in the filter at successive times corresponding to an output period of the filter, which is substantially independent of the input period;
- updating the intermediate results for each of the input samples;
- and outputting as an output sample, once in each output period, the intermediate result that was generated at an earliest one of the successive times among the intermediate results in the filter;
- determining a fractional interval indicative of a phase offset between the input period and the output period, wherein processing and updating the intermediate results comprises computing the intermediate results responsive to the fractional interval.

* * * * *